United States Patent
Yamasaki (10) Patent No.: US 9,233,761 B2
(45) Date of Patent: Jan. 12, 2016

(54) DISPLAY APPARATUS, CONTROL SUPPORT SYSTEM, AND DISPLAY METHOD

(75) Inventor: Koichi Yamasaki, Tokyo (JP)

(73) Assignees: MITSUBISHI HEAVY INDUSTRIES, LTD., Tokyo (JP); THE SOCIETY OF JAPANESE AEROSPACE COMPANIES, Tokyo (JP)

( * ) Notice: Subject to any disclaimer, the term of this patent is extended or adjusted under 35 U.S.C. 154(b) by 0 days.

(21) Appl. No.: 13/806,589

(22) PCT Filed: Jun. 24, 2011

(86) PCT No.: PCT/JP2011/064539
§ 371 (c)(1),
(2), (4) Date: Dec. 21, 2012

(87) PCT Pub. No.: WO2012/002276
PCT Pub. Date: Jan. 5, 2012

(65) Prior Publication Data
US 2013/0096738 A1    Apr. 18, 2013

(30) Foreign Application Priority Data

Jul. 1, 2010   (JP) ................................. 2010-151220

(51) Int. Cl.
*G06F 19/00* (2011.01)
*G06F 17/00* (2006.01)
(Continued)

(52) U.S. Cl.
CPC ................ *B64D 45/00* (2013.01); *G01C 23/00* (2013.01); *G01C 23/005* (2013.01)

(58) Field of Classification Search
CPC ........ B64D 45/00; B64D 27/00; G01C 23/00; G06F 8/433; G06F 8/456
USPC ........ 701/14, 6, 3, 4; 340/945–980; 244/75.1, 244/178–186, 191
See application file for complete search history.

(56) References Cited

U.S. PATENT DOCUMENTS 3,930,610 A * 1/1976 Hache .............................. 701/6
4,230,290 A * 10/1980 Townsend et al. ............ 244/1 R
(Continued)

FOREIGN PATENT DOCUMENTS

| JP | 63-503093 | 11/1988 |
|----|-----------|---------|
| JP | 4-67200   | 6/1992  |

(Continued)

OTHER PUBLICATIONS

FY 2009, "Advanced aircraft Technology Development Center contract research report", ISSN 1880-3660, Mar. 2010.
(Continued)

*Primary Examiner* — Fadey Jabr
*Assistant Examiner* — Angelina Shudy
(74) *Attorney, Agent, or Firm* — Wenderoth, Lind & Ponack, L.L.P.

(57) ABSTRACT

A flight path maker (FPM) and a target attitude relative to air display are displayed on a primary flight display (PFD), which is an integrated indicator. The target attitude relative to air display is a mark indicating a target attitude relative to air representing a target angle-of-attack and a target sideslip angle of the aircraft to achieve a target flight path. The PFD displays the relative difference between the FPM and the target attitude relative to air display and shows that the aircraft is flying in the target traveling direction when the FPM matches (is superposed on) the target attitude relative to air display. Thus, controlling with higher trackability than controlling performed based on a target attitude relative to ground is enabled.

8 Claims, 7 Drawing Sheets

(51) Int. Cl.
*B64C 19/00* (2006.01)
*G05D 1/00* (2006.01)
*G08G 5/00* (2006.01)
*G01C 23/00* (2006.01)
*B64D 45/00* (2006.01)

(56) References Cited

U.S. PATENT DOCUMENTS

| | | | |
|---|---|---|---|
| 4,507,657 A * | 3/1985 | Bates | 340/959 |
| 5,382,954 A * | 1/1995 | Kennedy et al. | 340/961 |
| 5,420,582 A * | 5/1995 | Kubbat et al. | 340/974 |
| 5,526,265 A * | 6/1996 | Nakhla | 701/16 |
| 5,590,853 A * | 1/1997 | Greene | 244/184 |
| 6,057,786 A | 5/2000 | Briffe et al. | |
| 6,177,888 B1 * | 1/2001 | Cabot | G01C 23/00 340/968 |
| 6,253,166 B1 * | 6/2001 | Whitmore | G01P 13/025 700/89 |
| 6,255,965 B1 | 7/2001 | D'Orso | |
| 6,272,404 B1 | 8/2001 | Amano et al. | |
| 6,273,370 B1 * | 8/2001 | Colgren | G01C 21/16 244/181 |
| 6,317,059 B1 * | 11/2001 | Purpus et al. | 340/974 |
| 6,539,290 B1 * | 3/2003 | Vos | G05B 9/02 244/181 |
| 6,751,529 B1 * | 6/2004 | Fouche | 701/3 |
| 7,010,398 B2 * | 3/2006 | Wilkins et al. | 701/3 |
| 7,347,090 B1 * | 3/2008 | Childers et al. | 73/170.02 |
| 7,616,130 B2 * | 11/2009 | Astruc et al. | 340/946 |
| 7,724,155 B1 * | 5/2010 | Anderson et al. | 340/975 |
| 7,894,950 B2 * | 2/2011 | Williamson | B64D 39/00 244/135 A |
| 7,952,493 B2 * | 5/2011 | Wyatt et al. | 340/974 |
| 8,219,264 B1 * | 7/2012 | Blake | B64D 39/00 701/3 |
| 8,321,077 B1 * | 11/2012 | Garcia-Llama | 701/13 |
| 8,344,911 B1 * | 1/2013 | Wenger et al. | 340/973 |
| 8,421,649 B2 * | 4/2013 | Marstall et al. | 340/975 |
| 8,761,970 B2 * | 6/2014 | McIntyre | B64C 13/503 340/975 |
| 2001/0039467 A1 * | 11/2001 | Katz et al. | 701/4 |
| 2005/0012642 A1 * | 1/2005 | Sacle | 340/974 |
| 2005/0143871 A1 * | 6/2005 | Boorman et al. | 701/3 |
| 2005/0206533 A1 * | 9/2005 | Rogers et al. | 340/979 |
| 2006/0164262 A1 * | 7/2006 | Wyatt et al. | 340/973 |
| 2007/0080828 A1 * | 4/2007 | He | 340/974 |
| 2007/0085705 A1 * | 4/2007 | He et al. | 340/967 |
| 2007/0179684 A1 | 8/2007 | He | |
| 2009/0069959 A1 * | 3/2009 | Horvath et al. | 701/8 |
| 2009/0087029 A1 * | 4/2009 | Coleman et al. | 382/103 |
| 2009/0173789 A1 * | 7/2009 | Howard | 235/412 |
| 2009/0207048 A1 * | 8/2009 | He et al. | 340/974 |
| 2009/0259402 A1 * | 10/2009 | Gates et al. | 701/301 |
| 2009/0295602 A1 * | 12/2009 | Cernasov et al. | 340/974 |
| 2010/0100260 A1 * | 4/2010 | McIntyre et al. | 701/6 |
| 2010/0131126 A1 * | 5/2010 | He et al. | 701/14 |
| 2010/0141482 A1 * | 6/2010 | Wyatt et al. | 340/975 |
| 2010/0185345 A1 * | 7/2010 | Chiesa | G05D 1/0825 701/4 |
| 2010/0194602 A1 * | 8/2010 | Engels et al. | 340/979 |
| 2010/0274444 A1 * | 10/2010 | Williamson et al. | 701/34 |
| 2010/0318336 A1 * | 12/2010 | Falangas | 703/8 |
| 2011/0118912 A1 * | 5/2011 | Shuster | 701/18 |
| 2011/0205090 A1 * | 8/2011 | Marstall et al. | 340/975 |
| 2012/0004793 A1 * | 1/2012 | Block | 701/9 |
| 2012/0179307 A1 * | 7/2012 | Boorman et al. | 701/3 |
| 2012/0212350 A1 * | 8/2012 | Magnell | 340/850 |
| 2012/0299753 A1 * | 11/2012 | Thoreen | 340/975 |
| 2012/0303184 A1 * | 11/2012 | Gerthoffert et al. | 701/7 |
| 2013/0060405 A1 * | 3/2013 | Komatsuzaki | G05D 1/0646 701/3 |
| 2015/0084792 A1 * | 3/2015 | Barth | B64D 43/02 340/966 |
| 2015/0234388 A1 * | 8/2015 | Yamasaki | G05D 1/104 701/302 |

FOREIGN PATENT DOCUMENTS

| | | |
|---|---|---|
| JP | 2832249 | 12/1998 |
| JP | 2923509 | 7/1999 |
| JP | 2939234 | 8/1999 |
| JP | 11-268696 | 10/1999 |
| JP | 11-271101 | 10/1999 |
| JP | 2002-267488 | 9/2002 |
| JP | 3558278 | 8/2004 |
| RU | 39960 | 8/2004 |

OTHER PUBLICATIONS

International Search Report issued Sep. 27, 2011 in corresponding International (PCT) Application No. PCT/JP2011/064539.
Written Opinion of the International Searching Authority issued Sep. 27, 2011 in corresponding International (PCT) Application No. PCT/JP2011/064539.
"Research for Enhancement of Competitiveness of the Plane Industry Progress Report No. 2202"; published Mar. 2011 (with English abstract).
Iijima, et al.; "Pilot Workload Assessment for Curved Approach by Tunnel-in-the-Sky Display"; International Association of Traffic and Safety Sciences; vol. 26, No. 2; pp. 111-119; Feb. 2001 (with English abstract).
"Technical Memorandum of National Aerospace Laboratory"; National Aerospace Laboratory of Japan; TM-764; Jun. 2002 (with English abstract).
The EADI.
Russian Office Action issued May 30, 2014 in corresponding Russian Application No. 2012153788 with English translation.
"Aviation", Moscow, The Great Russian Encyclopedia, 1994, "Heading, ground, speed, axis system, sideslip, pitch, angle of attack", respectively on pp. 301, 462, 520, 521, 554, 600.
Japanese Office Action issued Apr. 30, 2014 in corresponding Japanese Patent Application No. 2010-151220 with English translation.
Chinese Notice of Allowance issued Mar. 30, 2015 in corresponding Chinese Patent Application No. 201180031445.0 with explanation of relevance.
Notice of Allowance issued Oct. 6, 2015 in corresponding Canadian Application No. 2,803,810.

* cited by examiner

DISPLAY APPARATUS, CONTROL SUPPORT SYSTEM, AND DISPLAY METHOD

TECHNICAL FIELD

The present invention relates to a display apparatus, a control support system, and a display method.

BACKGROUND ART

An airplane is conventionally provided with an ILS (instrument landing system) and a TIS (tunnel in the sky) for obtaining the deviation angle and the relative position of the target flight path from the airplane. The deviation angle and the relative position obtained with the ILS and the TIS are displayed on a PFD (primary flight display) or an ADI (attitude direction indicator), which is a display apparatus for displaying the flying situation of the aircraft, thereby assisting the pilot of the airplane to perform control for tracking the target flight path.

Figure 7:
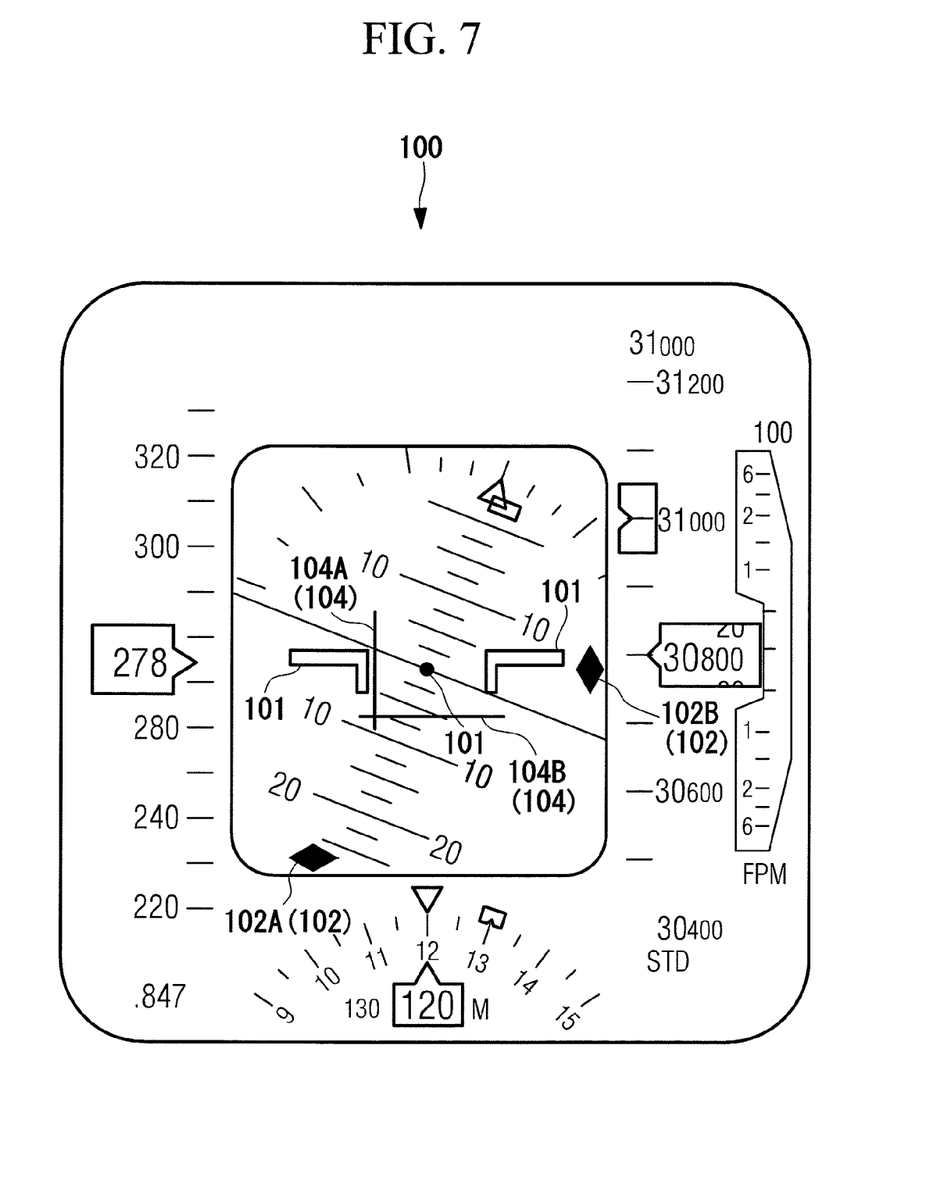
FIG. 7 is a schematic view showing an example conventional PFD.

FIG. 7 shows an example conventional PFD 100. The PFD 100 shown in FIG. 7 shows ILS displays 102 and FD (flight director) command and bar displays 104, together with airplane reference symbols 101 that indicate the aircraft, which is an airplane.

The ILS displays 102 indicate the deviation angle (ILS display 102A) of the aircraft from a localizer and the deviation angle (ILS display 102B) of the aircraft from a glide slope. The example in FIG. 7 shows that the target flight path is located at the left side of the aircraft.

The FD-command and bar displays 104 indicate attitude (pitch angle and bank angle) commands for the aircraft for tracking the target flight path. Note that, in the example of FIG. 7, a bank-angle command display 104A gives an instruction to bank the aircraft left, and a pitch-angle command display 104B gives an instruction to lower the pitch of the aircraft.

Furthermore, PTL 1 discloses a flight-path display apparatus in which, when the display position of the flight path of the airplane is located outside the display range of an image combining panel included in a head-up display device, a target mark indicating the direction from the display range center of the image combining panel toward the flight path is displayed on the image combining panel. Note that the above-described flight path is composed of a plurality of path marks, and the path marks are inclined according to the attitude of the airframe estimated when the airframe is displayed on the path marks.

CITATION LIST

Patent Literature

{PTL 1} Japanese Unexamined Patent Application, Publication No. Hei 11-268696

SUMMARY OF INVENTION

Technical Problem

However, with the ILS, the TIS, and the flight-path display apparatus described in PTL 1, the pilot can recognize the deviation angle and the relative position of the aircraft with respect to the target flight path of the aircraft but cannot grasp how to control the aircraft to track the target flight path.

Furthermore, the FD-command and bar displays 104 are marks indicating the target pitch angle and the target bank angle (the target pitch angle and the target bank angle are also collectively referred to as "target attitude relative to ground"), which are required for the aircraft to track the target flight path. The pitch angle and the bank angle of the aircraft do not indicate the traveling direction of the aircraft itself but indicate the direction of the nose thereof, and the direction of the nose thereof does not necessarily match the traveling direction. Thus, the FD-command and bar displays 104 merely indicate the attitude relative to ground, which is indirect information required to achieve the direction in which the aircraft should travel. The same applies to the ILS, the TIS, and the flight-path display apparatus described in PTL 1, and, with the PFD 100 shown in FIG. 7, the pilot cannot clearly recognize the traveling direction of the aircraft, in some cases.

Therefore, the PFD 100 shown in FIG. 7 and the flight-path display apparatus described in PTL 1 have a problem in that overcontrol or undercontrol is caused during control for tracking the target flight path.

The present invention has been made in view of such circumstances, and an object thereof is to provide an airplane display apparatus, control support system, and display method that enable controlling with higher trackability than airplane controlling performed based on the target attitude relative to ground.

Solution to Problem

According to a first aspect, the present invention provides a display apparatus that displays a flying situation of an airplane, which is an aircraft, wherein the display apparatus displays a relative difference between a target attitude relative to air, representing a target angle-of-attack and a target sideslip angle of the aircraft to achieve a target flight path, and a current attitude relative to air, representing a current angle-of-attack and a current sideslip angle of the aircraft.

According to the above-described aspect, the display apparatus, which displays the flying situation of the airplane, which is the aircraft, displays the relative difference between the target attitude relative to air, representing the target angle-of-attack and the target sideslip angle of the aircraft to achieve the target flight path, and the current attitude relative to air, representing the current angle-of-attack and the current sideslip angle of the aircraft.

If the airplane is controlled based on the target attitude relative to ground (the direction of the nose) indicated by the target pitch angle and the target bank angle, overcontrol or undercontrol is caused during control for tracking the target flight path, in some cases, because the attitude relative to ground does not indicate the traveling direction of the airplane.

However, the attitude relative to air indicates the traveling direction of the airplane. Thus, in the present invention, the target traveling direction is indicated in the form of the target attitude relative to air, and the relative difference between the target attitude relative to air and the current attitude relative to air is displayed, thereby enabling controlling with higher trackability than airplane controlling performed based on the target attitude relative to ground. In particular, for example, when all control surfaces become inoperative, and control for tracking the target flight path is performed with engine thrust alone, it is difficult for the pilot to judge adequate control levels because of the slow response and slow movement of the aircraft. However, according to the present invention, even when control for tracking the target flight path is performed with engine thrust alone, the pilot can perform the tracking control of the aircraft with greater precision.

Furthermore, in the above-described first aspect, it is preferred that the target angle-of-attack be derived by subtracting an angle between a horizontal plane and a target traveling direction from a current pitch angle of the aircraft; and the target sideslip angle be derived by subtracting a current direction angle of the aircraft from an direction angle of the target traveling direction.

According to the above-described aspect, the target angle-of-attack is derived by subtracting the angle between the horizontal plane and the target traveling direction from the current pitch angle of the aircraft, and the target sideslip angle is derived by subtracting the current direction angle of the aircraft from the direction angle of the target traveling direction. The current pitch angle of the aircraft and the current direction angle of the aircraft are information obtained from existing sensors provided in the airplane, which is the aircraft, and the angle between the horizontal plane and the target traveling direction and the direction angle of the target traveling direction are information obtained through automatic control. According to the present invention, it is possible to easily derive the target angle-of-attack and the target sideslip angle.

Furthermore, in the above-described first aspect, it is preferred that a first mark corresponding to the target attitude relative to air and a second mark corresponding to the current attitude relative to air be displayed.

According to the above-described aspect, the first mark corresponding to the target attitude relative to air and the second mark corresponding to the current attitude relative to air are displayed on the display apparatus. Therefore, the pilot can easily recognize the target attitude relative to air and the current attitude relative to air of the aircraft. According to the present invention, the convenience of the pilot can be improved.

Furthermore, in the above-described first aspect, it is preferred that the relative positions of the first mark and the second mark be displayed while being changed according to the relative difference between the target attitude relative to air and the current attitude relative to air.

According to the above-described aspect, the relative positions of the first mark and the second mark are displayed while being changed according to the relative difference between the target attitude relative to air and the current attitude relative to air. Thus, as the aircraft approaches the target traveling direction, the first mark and the second mark come close to each other, and the first mark and the second mark are superposed when the aircraft is flying in the target traveling direction. Therefore, the pilot can easily make the aircraft achieve the target flight path. According to the present invention, the convenience of the pilot can be improved.

Furthermore, in the above-described first aspect, it is preferred that the target flight path be derived based on a current position of the aircraft and a target position that the aircraft should reach.

The current position of the aircraft is obtained by using a GPS (global positioning system) sensor, for example, and the target position is derived by a computer installed in the aircraft, for example.

For example, tracking control using a target flight path that is indicated based on radio waves output from the glide slope antenna and the localizer antenna, which are airport installations, i.e., tracking control using the ILS, allows only for guiding the aircraft for landing from an area near the airport.

However, tracking control using a target flight path that is generated based on the current position of the aircraft and the target position that the aircraft should reach allows for control the aircraft to an airport (target position) from an area where the ILS is not available, for example, in the event of an emergency descent from high altitude or a change in direction angle when a fault occurs in the aircraft.

According to a second aspect, the present invention provides a control support system including: a display apparatus that displays a relative difference between a target attitude relative to air, representing a target angle-of-attack and a target sideslip angle of an aircraft to achieve a target flight path, and a current attitude relative to air, representing a current angle-of-attack and a current sideslip angle of the aircraft; and a control device that is provided with a target angle-of-attack deriving unit for deriving the target angle-of-attack by subtracting an angle between a horizontal plane and a target traveling direction from a current pitch angle of the aircraft and a target sideslip angle deriving unit for deriving the target sideslip angle by subtracting a current direction angle of the aircraft from an direction angle of the target traveling direction and that controls the display apparatus so as to display the relative difference between the current attitude relative to air and the target attitude relative to air, which represents the derived target angle-of-attack and target sideslip angle.

According to the above-described aspect, the target traveling direction is derived in the form of the target attitude relative to air, and the display apparatus displays the relative difference between the target attitude relative to air and the current attitude relative to air, thereby enabling controlling with higher trackability than airplane controlling performed based on the target attitude relative to ground.

According to a third aspect, the present invention provides a display method of displaying, on a display apparatus, a flying situation of an airplane, which is an aircraft, the method including displaying, on the display apparatus, a relative difference between a target attitude relative to air, representing a target angle-of-attack and a target sideslip angle of the aircraft to achieve a target flight path, and a current attitude relative to air, representing a current angle-of-attack and a current sideslip angle of the aircraft.

According to the above-described aspect, the target traveling direction is derived in the form of the target attitude relative to air, and the display apparatus displays the relative difference between the target attitude relative to air and the current attitude relative to air, thereby enabling controlling with higher trackability than airplane controlling performed based on the target attitude relative to ground.

Advantageous Effects of Invention

The present invention provides the advantage that controlling with higher trackability than airplane controlling performed based on the target attitude relative to ground is enabled.

BRIEF DESCRIPTION OF DRAWINGS

FIG. 2 shows schematic views for explaining a target attitude relative to air display displayed on the PFD according to the embodiment of the present invention, where FIG. 2(a) shows an example PFD, FIG. 2(b-1) shows the relationship between the aircraft and a target flight path, corresponding to the target attitude relative to air display displayed on the PFD in FIG. 2(a), FIG. 2(b-2) is a top view corresponding to FIG. 2(b-1), and FIG. 2(b-3) is a side view corresponding to FIG. 2(b-1).

FIG. 6 shows schematic views showing changes in the display on the PFD according to the embodiment of the present invention until the target flight path of the airplane is achieved, where FIG. 6(a) shows a state in which the aircraft is flying in a traveling direction that deviates from a target traveling direction, FIG. 6(b) shows a state in which the aircraft is flying in the target traveling direction, and FIG. 6(c) shows a state in which the aircraft has continued to fly such that the target attitude relative to air display and an FPM are superposed.

DESCRIPTION OF EMBODIMENTS

A display apparatus, a control support system, and a display method according to an embodiment of the present invention will be described below with reference to the drawings.

Figure 1:
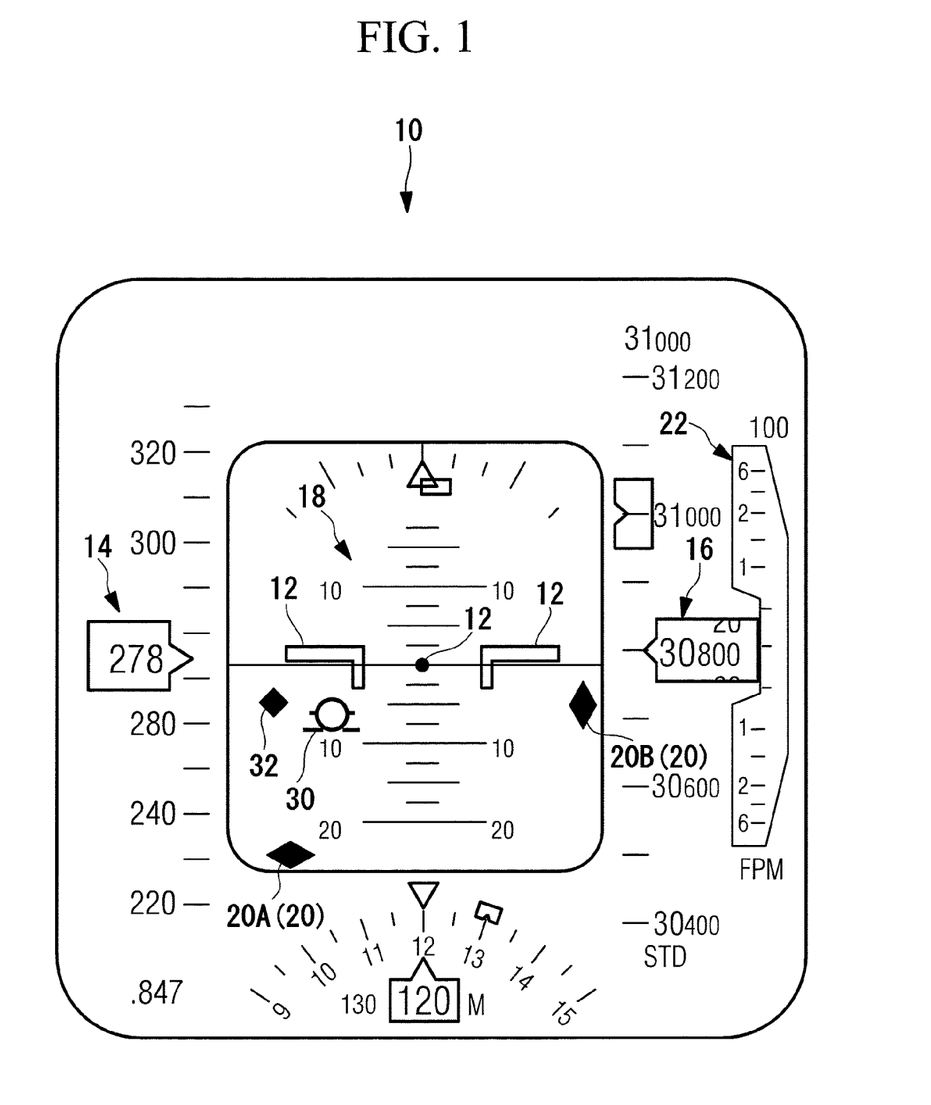
FIG. 1 is a schematic view showing an example PFD according to an embodiment of the present invention.

FIG. 1 shows an example PFD 10 that is a display apparatus according to this embodiment, for displaying the flying situation of an airplane, which is an aircraft.

The PFD 10 is an integrated indicator and includes airplane reference symbols 12, an airspeed indicator 14 that indicates the airspeed of the aircraft, an altimeter 16 that indicates the altitude of the aircraft, a pitch indicator 18 that indicates the pitch angle of the aircraft, ILS displays (ILS displays 20A and 20B), and a vertical speed indicator 22 that indicates the vertical speed of the aircraft.

Furthermore, an FPM (flight path marker) 30, which is a mark used for assisting a pilot to control the aircraft, and a target attitude relative to air display 32 are displayed on the PFD 10 of this embodiment.

The FPM 30 is a mark indicating the current attitude relative to air, which represents the current angle-of-attack of the aircraft (angle between projection of the traveling direction of the aircraft onto the airframe symmetry plane and the axis) and the current sideslip angle thereof (angle between the traveling direction of the aircraft and the airframe symmetry plane), in other words, a mark indicating the traveling direction of the aircraft. Note that, if the angle-of-attack of the aircraft is large or if the sideslip angle of the aircraft is large, the traveling direction of the aircraft does not match the direction of the nose of the aircraft. Therefore, the FPM 30 indicating the traveling direction of the aircraft is displayed on the PFD 10, thereby making it possible for the pilot to easily recognize the current traveling direction of the aircraft.

On the other hand, the target attitude relative to air display 32 is a mark indicating a target attitude relative to air that represents a target angle-of-attack and a target sideslip angle of the aircraft to achieve the target flight path.

Figure 2:
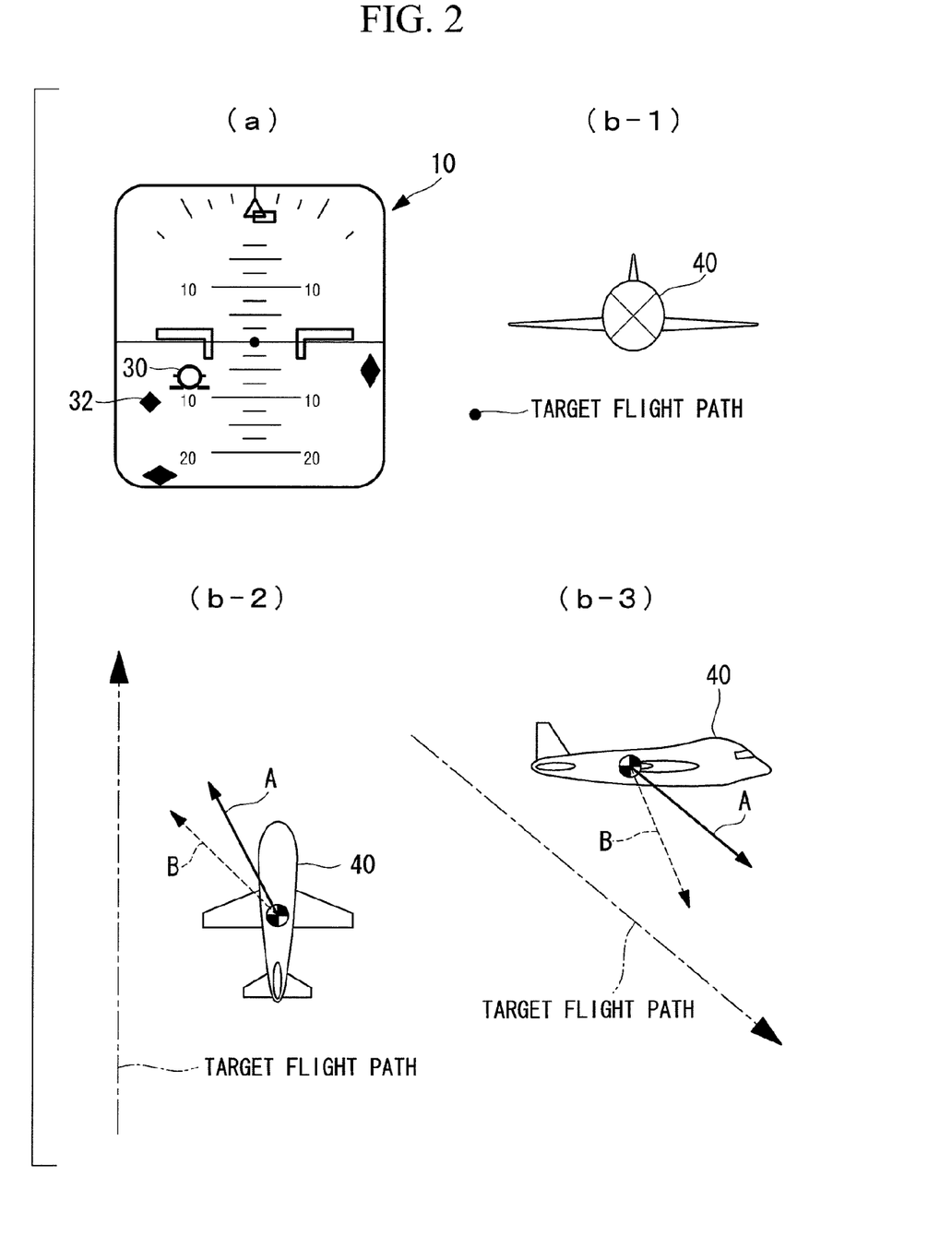

FIG. 2 shows views showing the positional relationship among the FPM 30 and the target attitude relative to air display 32, which are displayed on the PFD 10, the aircraft 40, which is the airplane, and the target flight path.

FIG. 2(b-1) is a view showing the relationship between the aircraft 40 and the target flight path, corresponding to the target attitude relative to air display 32 displayed on the PFD 10 shown in FIG. 2(a), when the aircraft 40 flying in the traveling direction is viewed from the back thereof.

On the other hand, FIG. 2(b-2) is a top view corresponding to FIG. 2(b-1), and FIG. 2(b-3) is a side view corresponding to FIG. 2(b-1). In FIGS. 2(b-2) and (b-3), the solid line A extending from the center of gravity of the aircraft 40 indicates the traveling direction of the aircraft 40 corresponding to the FPM 30, and the dashed line B extending therefrom indicates the target traveling direction of the aircraft 40 corresponding to the target attitude relative to air display 32.

The PFD 10 of this embodiment displays the relative difference between the FPM 30 and the target attitude relative to air display 32. Specifically, when the FPM 30 matches (is superposed on) the target attitude relative to air display 32, the aircraft is flying in the target traveling direction.

Figure 3:
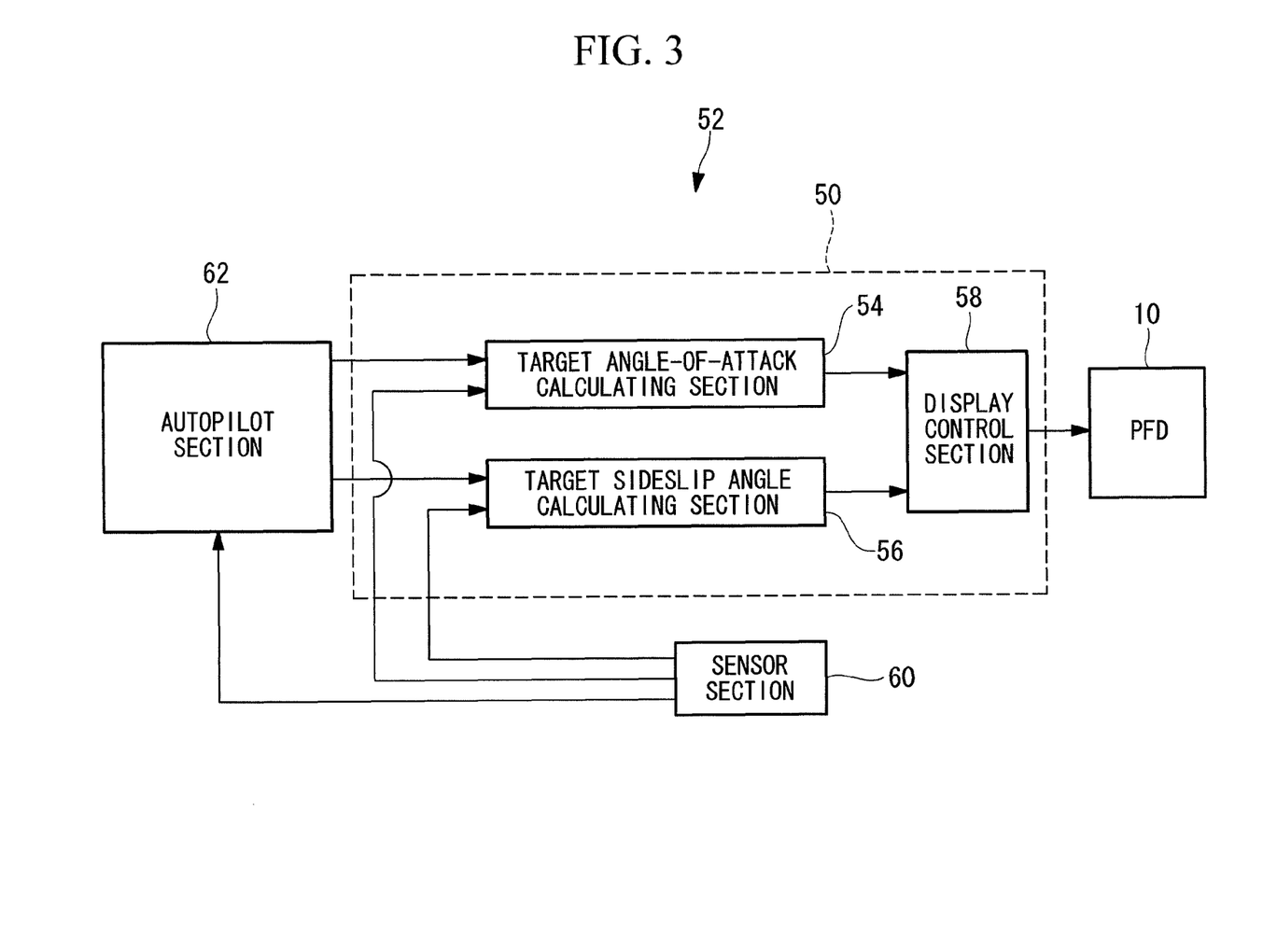
FIG. 3 is a functional block diagram showing the electrical configuration of a control support system according to the embodiment of the present invention.

FIG. 3 is a functional block diagram of a control support system 52 that includes a control device 50 for causing the PFD 10 of this embodiment to display various data items. Note that, among the functions of the control device 50, FIG. 3 shows only functions required to cause the PFD 10 to display the target attitude relative to air display 32. Specifically, the control device 50 has, besides the function for causing the PFD 10 to display the target attitude relative to air display 32, functions for causing it to display the airplane reference symbols 12, the airspeed indicator 14, the altimeter 16, the pitch indicator 18, the ILS displays 20, the FPM 30, and the vertical speed indicator 22.

The control device 50 includes a target angle-of-attack calculating section 54, a target sideslip angle calculating section 56, and a display control section 58.

Note that the control device 50 is connected to a sensor section 60 and an autopilot section 62 and receives various types of information therefrom.

The sensor section 60 is provided with various sensors to measure the altitude and the speed of the aircraft 40, the deviation angle of the aircraft 40 with respect to the target flight path, and the direction angle and the pitch angle of the aircraft 40.

The autopilot section 62 generates various types of information required for automatic control of the aircraft 40, based on information about the altitude of the aircraft 40, the speed thereof, and the deviation angle thereof with respect to the target flight path, which is received from the sensor section 60, such that the aircraft 40 can fly in the target flight path displayed based on radio waves output from a glide slope antenna and a localizer antenna of an ILS.

The target angle-of-attack calculating section 54 derives the target angle-of-attack by subtracting an angle between the horizontal plane and the target traveling direction from the current pitch angle of the aircraft 40.

A description will be given of how to derive a target angle-of-attack a with reference to a side view of the aircraft 40 shown in FIG. 4.

Figure 4:
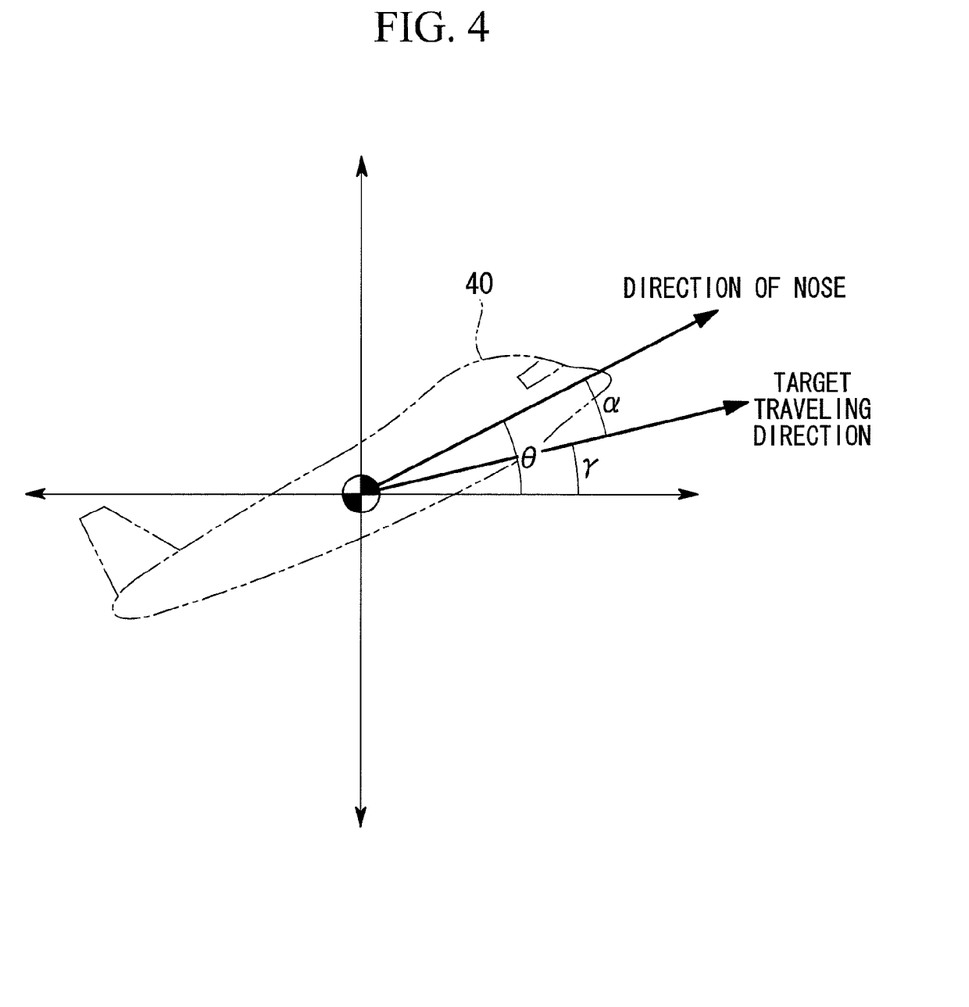
FIG. 4 is a schematic view for explaining how to derive a target angle-of-attack according to the embodiment of the present invention.

As shown in FIG. 4, the angle between the direction of the nose of the aircraft 40 and the horizontal plane corresponds to the current pitch angle $\theta$ of the aircraft 40. Note that the pitch angle $\theta$ is measured by the sensor section 60. On the other hand, a path angle $\gamma$ between the horizontal plane and the target traveling direction is derived in the autopilot section 62 based on the target flight path indicated by the ILS and is output to the target angle-of-attack calculating section 54 as a path angle command $\gamma_{cmd}$ indicating the path angle $\gamma$.

The target angle-of-attack calculating section 54 calculates a target angle-of-attack command $\alpha_{cmd}$ indicating the target angle-of-attack a, as shown in Equation (1), and outputs it to the display control section 58.

{Equation 1}

$$\alpha_{cmd} = \theta - \gamma_{cmd} \quad (1)$$

Note that Equation (1) is a simple derivation equation, and Equations (2) to (4) are used in order to more rigorously derive the target angle-of-attack command $\alpha_{cmd}$.

{Equation 2}

$$\alpha_{cmd} = \arctan\left(\frac{A}{B}\right) \quad (2)$$

{Equation 3}

$$A = \cos\phi \cdot \sin\theta \cdot \cos\gamma_{cmd} - \cos\phi \cdot \cos\theta \cdot \sin\gamma_{cmd} \quad (3)$$

{Equation 4}

$$B = \cos\theta \cdot \cos\gamma_{cmd} + \sin\theta \cdot \sin\gamma_{cmd} \quad (4)$$

Note that φ indicates a bank angle of the aircraft 40, and, when the bank angle φ is 0 (zero), Equation (2) is equivalent to Equation (1).

On the other hand, the target sideslip angle calculating section 56 derives the target sideslip angle by subtracting the current direction angle of the aircraft from the direction angle of the target traveling direction.

A description will be given of how to derive a target sideslip angle β with reference to a top view of the aircraft 40 shown in FIG. 5.

Figure 5:
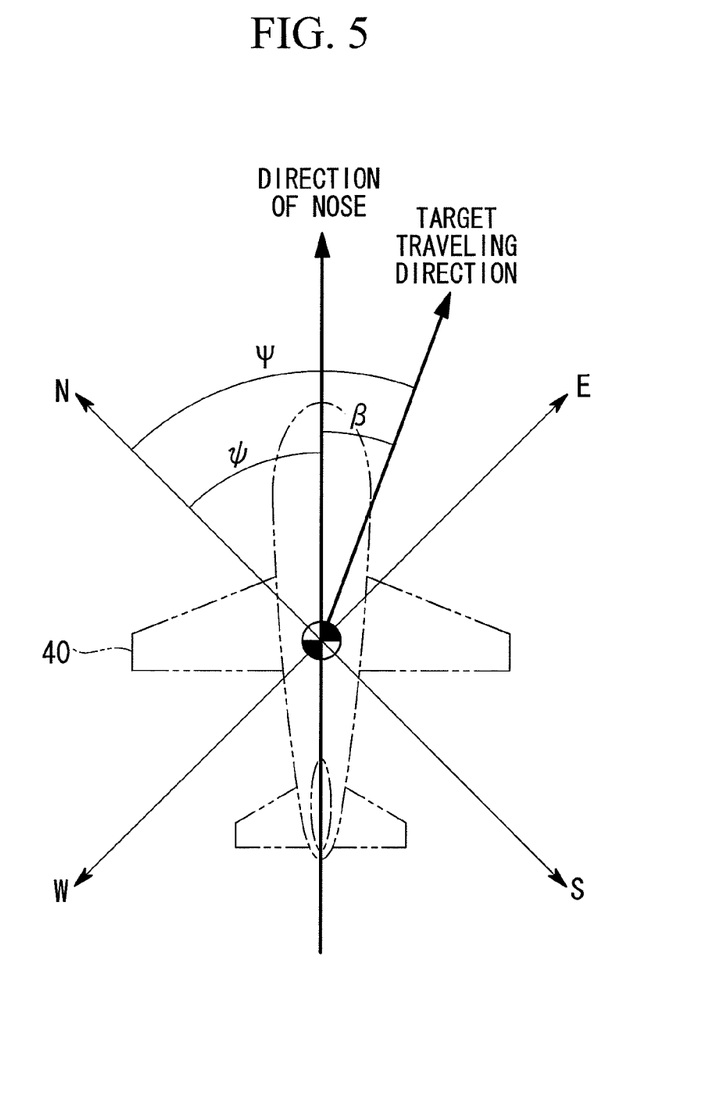
FIG. 5 is a schematic view for explaining how to derive a target sideslip angle according to the embodiment of the present invention.

As shown in FIG. 5, the angle between the direction of the nose of the aircraft 40 and a reference direction (for example, north (N)) corresponds to the current direction angle ψ of the aircraft 40. Note that the current direction angle ψ is measured by the sensor section 60. On the other hand, an direction angle Ψ of the target traveling direction, which is the angle between the reference direction and the target traveling direction, is derived in the autopilot section 62 based on the target flight path indicated by the ILS and is output to the target sideslip angle calculating section 56 as an direction angle command $\Psi_{cmd}$ indicating the direction angle Ψ of the target traveling direction.

The target sideslip angle calculating section 56 calculates a target sideslip angle command $\beta_{cmd}$ indicating the target sideslip angle β, as shown in Equation (5), and outputs it to the display control section 58.

{Equation 5}

$$\beta_{cmd} = \Psi_{cmd} - \psi \quad (5)$$

Note that Equation (5) is a simple derivation equation, and Equations (6) to (9) are used in order to more rigorously derive the target sideslip angle command $\beta_{cmd}$.

{Equation 6}

$$\beta_{cmd} = \arctan\left(\frac{C+D}{E}\right) \quad (6)$$

{Equation 7}

$$C = (\sin\phi \cdot \sin\theta \cdot \cos\psi - \cos\phi \cdot \sin\psi) \cdot \cos\Psi_{cmd} \quad (7)$$

{Equation 8}

$$D = (\sin\phi \cdot \sin\theta \cdot \sin\psi + \cos\phi \cdot \cos\psi) \cdot \sin\Psi_{cmd} \quad (8)$$

-continued

{Equation 9}

$$E = \cos\theta \cdot \cos\psi \cdot \cos\Psi_{cmd} + \cos\theta \cdot \sin\psi \cdot \sin\Psi_{cmd} \quad (9)$$

Note that, when the pitch angle θ and the bank angle φ are 0 (zero), Equation (6) is equivalent to Equation (5).

The display control section 58 derives a display position of the target attitude relative to air display 32 on the PFD 10, corresponding to the target angle-of-attack command $\alpha_{cmd}$ output from the target angle-of-attack calculating section 54 and the target sideslip angle command $\beta_{cmd}$ output from the target angle calculating section 56, and controls the PFD 10 so as to display the target attitude relative to air display 32 at the derived display position.

Note that, in this embodiment, the path angle command $\gamma_{cmd}$ and the direction angle command $\Psi_{cmd}$ are derived in the autopilot section 62; however, this does not mean that the target attitude relative to air display 32 is displayed on the PFD 10 only when automatic control is used. When automatic control is not used, the path angle command $\gamma_{cmd}$ and the direction angle command $\Psi_{cmd}$ are also derived in the autopilot section 62, the target attitude relative to air display 32 is displayed on the PFD 10, and the pilot uses the target attitude relative to air display 32 as a reference for controlling the aircraft. Furthermore, when automatic control is used, the path angle command $\gamma_{cmd}$ and the direction angle command $\Psi_{cmd}$ may be derived in the autopilot section 62, and the target attitude relative to air display 32 may be displayed on the PFD 10.

Figure 6:
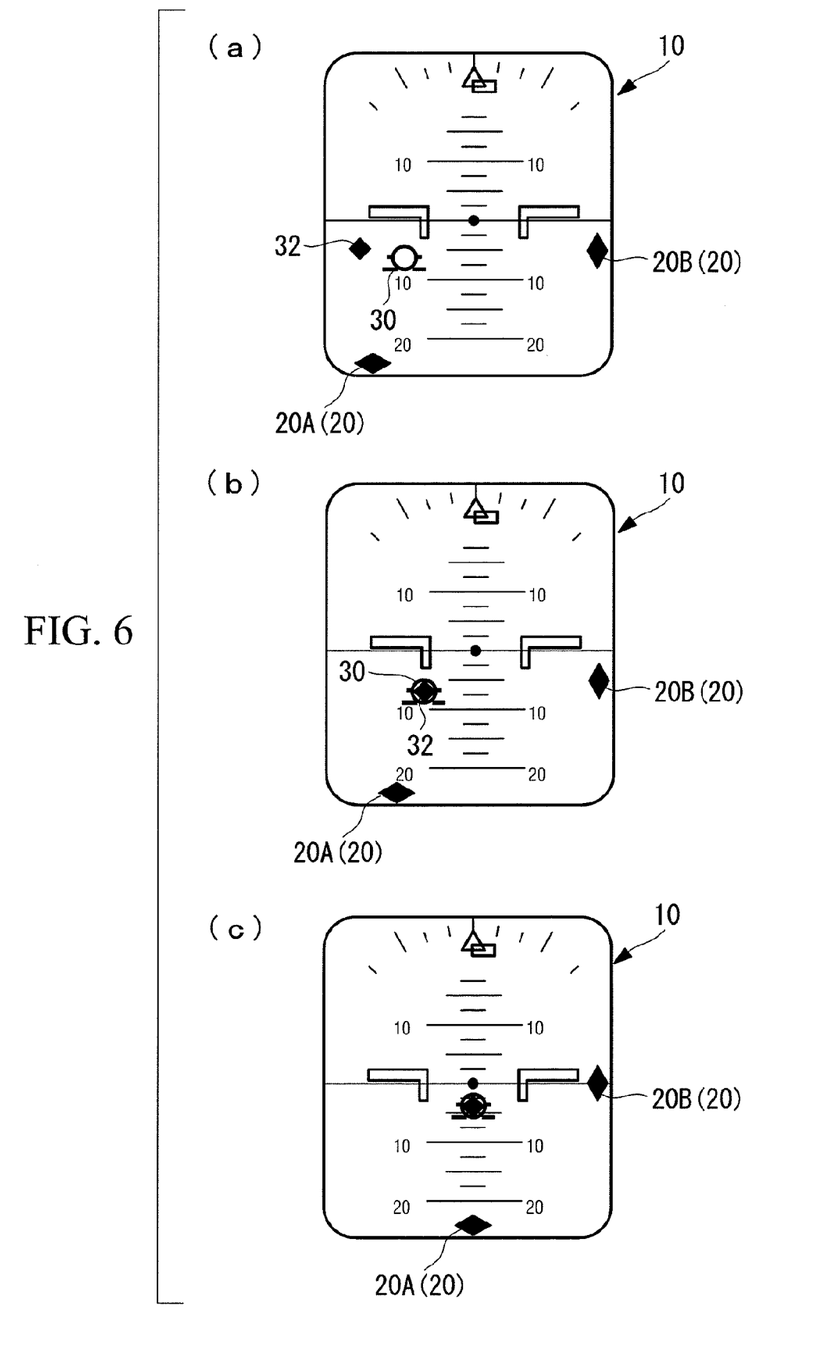

FIG. 6 shows changes in the display on the PFD 10 until the aircraft 40 achieves the target flight path.

FIG. 6(*a*) shows a state in which the target attitude relative to air display 32 and the FPM 30 are displayed at different positions on the PFD 10 because the aircraft 40 is flying in a traveling direction that deviates from the target traveling direction. Therefore, the pilot controls the aircraft 40 so that the target attitude relative to air display 32 and the FPM 30 become superposed. As a result, the target attitude relative to air display 32 and the FPM 30 gradually come close to each other. When the target attitude relative to air display 32 and the FPM 30 are superposed, as shown in FIG. 6(*b*), the aircraft 40 is flying in the target traveling direction. Then, after the aircraft 40 continues to fly with the target attitude relative to air display 32 and the FPM 30 superposed, the FPM 30 and the target attitude relative to air display 32 move toward the center of the PFD 10, as shown in FIG. 6(*c*), and the ILS displays 20 also gradually move toward the center of the PFD 10.

As described above, the PFD 10 of this embodiment, which displays the flying situation of the aircraft 40, displays the relative difference between the target attitude relative to air, which represents the target angle-of-attack a and the target sideslip angle β of the aircraft 40 to achieve the target flight path, and the current attitude relative to air, which represents the current angle-of-attack and the current sideslip angle of the aircraft 40; therefore, controlling with higher trackability than airplane controlling performed based on the target attitude relative to ground is enabled.

In particular, for example, when all control surfaces become inoperative, and control for tracking the target flight path is performed with engine thrust alone, it is difficult for the pilot to judge adequate control levels because of the slow response and slow movement of the aircraft. However, with the PFD 10 of this embodiment, even when control for tracking the target flight path is performed with engine thrust alone, the pilot can perform the tracking control of the aircraft 40 with greater precision.

Furthermore, according to this embodiment, the target angle-of-attack a is derived by subtracting the angle between the horizontal plane and the target traveling direction from the current pitch angle of the aircraft 40, and the target sideslip angle β is derived by subtracting the current direction angle of the aircraft 40 from the direction angle of the target traveling direction. The current pitch angle of the aircraft 40 and the current direction angle of the aircraft 40 are information obtained from the existing sensor section 60 provided in the airplane, which is the aircraft 40, and the angle between the horizontal plane and the target traveling direction and the direction angle of the target traveling direction are information obtained through automatic control. Therefore, according to this embodiment, it is possible to easily derive the target angle-of-attack and the target sideslip angle.

Although the present invention has been described above using the above-described embodiment, the technical scope of the present invention is not limited to the range described in the above-described embodiment. Various modifications and improvements can be added to the above-described embodiment without departing from the scope of the invention, and embodiments to which such modifications and improvements are added are also encompassed in the technical scope of the present invention.

For example, in the above-described embodiment, a description has been given of a case where a target flight path that is displayed based on radio waves output from the glide slope antenna and the localizer, which are airport installations, is tracked; however, the present invention is not limited thereto, and a target flight path that is generated based on the current position of the aircraft 40 and the target position that the aircraft 40 should reach may be tracked.

More specifically, a positional information acquisition sensor (for example, GPS sensor) for measuring the current position (latitude, longitude, and altitude) of the aircraft 40 is installed in the aircraft 40, and a target flight path is derived by a computer installed in the aircraft 40 based on the current position of the aircraft 40, which is measured by the positional information acquisition sensor, and is stored in a storage section.

Note that the above-mentioned computer derives a target position (target airport) that the aircraft 40 should reach, from various conditions, e.g., the amount of remaining fuel in the aircraft 40; the reachable distance based on the remaining fuel; if a fault (for example, a fault in which all control surfaces become inoperative during a cruise flight, and it is necessary to steer the aircraft 40 to an airport with engine thrust alone) occurs in the aircraft 40, the maximum radius and minimum radius of circle allowed according to the fault state; the runway length of a candidate airport for landing at; and weather (wind, rain, cloud cover, visibility, etc.) around the candidate airport for landing at. Then, the computer derives the optimum flight path from the position of the aircraft 40 to the target airport and sets the derived optimum flight path as the target flight path. Note that the target position need not be derived by the computer but may be specified by the pilot.

Note that the computer may derive a target flight path at predetermined intervals and update the current target flight path with the derived target flight path in the storage section.

Then, the autopilot section 62 generates controlling commands that include the path angle command $\gamma_{cmd}$ and the direction angle command $\Psi_{cmd}$ based on the information indicating the relative position or the deviation angle of the aircraft 40 with respect to the target flight path stored in the storage section.

Thus, for example, tracking control using a target flight path that is displayed based on radio waves output from the glide slope antenna and the localizer antenna, which are airport installations, i.e., tracking control using the ILS, allows only for guiding the aircraft for landing from an area near the airport; however, tracking control using a target flight path that is generated based on the current position of the aircraft 40 and the target position that the aircraft 40 should reach allows for steering of the aircraft to an airport (target position) from an area where the ILS is not available, for example, in the event of an emergency descent from high altitude or a change in direction angle when a fault occurs in the aircraft 40.

Furthermore, in the above-described embodiment, a description has been given of a case where the ILS displays 20 are displayed on the PFD 10 together with the FPM 30 and the target attitude relative to air display 32; however, the present invention is not limited thereto. A configuration in which the ILS displays 20 are not displayed on the PFD 10, a configuration in which FD-command and bar displays are displayed on the PFD 10 together with the ILS displays 20, or a configuration in which another display for assisting the pilot in controlling the aircraft may be used.

Furthermore, in the above-described embodiment, a description has been given of a case where the PFD 10 is used as the display apparatus; however, the present invention is not limited thereto, and another means, such as an ADI, can be used as the display apparatus.

REFERENCE SIGNS LIST

10 PFD
30 FPM
32 target attitude relative to air display
40 aircraft (airplane)
50 control device

The invention claimed is:

1. A control support system including a sensor section that measures current information about flight in an airplane, which is an aircraft, an autopilot section that derives required information such that the aircraft can fly in a target flight path, and a display apparatus that displays a flying situation of the aircraft, the control support system comprising:
   a controller including:
       a target angle-of-attack deriving section that derives a target angle-of-attack of the aircraft to achieve the target flight path on the basis of a pitch angle measured by the sensor section and a path angle which is an angle between a horizontal plane and a target traveling direction of the aircraft and which is derived by the autopilot section;
       a target sideslip angle deriving section that derives a target sideslip angle of the aircraft to achieve the target flight path on the basis of a direction angle measured by the sensor section and a direction angle of the target traveling direction derived by the autopilot section; and
       a display control section that causes the display apparatus to display a relative difference between a target attitude relative to air, representing the target angle-of-attack that has been derived and the target sideslip angle that has been derived, and a current attitude relative to air, representing a current angle-of-attack and a current sideslip angle of the aircraft.

2. The control support system according to claim 1, wherein
the target angle-of-attack deriving section derives the target angle-of-attack by subtracting the path angle derived by the autopilot section from the pitch angle measured by the sensor section, and
the target sideslip angle deriving section derives the target sideslip angle by subtracting the direction angle measured by the sensor section from the direction angle of the target traveling direction derived by the autopilot section.

3. The control support system according to claim 1, wherein the display control section causes the display apparatus to display a first mark corresponding to the target attitude relative to air and a second mark corresponding to the current attitude relative to air.

4. The control support system according to claim 3, wherein the display control section causes the display apparatus to display relative positions of the first mark and the second mark while being changed according to the relative difference between the target attitude relative to air and the current attitude relative to air.

5. The control support system according claim 1, further comprising:
a positional information acquisition sensor that measures a current position of the aircraft; and
a computer that derives the target flight path based on the measured current position of the aircraft.

6. The control support system according claim 5, wherein
the computer derives a target position that the aircraft should reach based on the measured current position and a predetermined condition, and
the target flight path derived by the computer is an optimum flight path from the aircraft to the derived target position.

7. The control support system according claim 6, wherein the predetermined condition is a reachable distance of the aircraft based on remaining fuel of the aircraft.

8. A control support method in a control support system comprising a sensor section that measures current information about flight in an airplane, which is an aircraft, an autopilot section that derives required information such that the aircraft can fly in a target flight path, and a display apparatus that displays a flying situation of the aircraft, the control support method comprising:
deriving a target angle-of-attack of the aircraft to achieve the target flight path on the basis of a pitch angle measured by the sensor section and a path angle which is an angle between a horizontal plane and a target traveling direction of the aircraft and which is derived by the autopilot section;
deriving a target sideslip angle of the aircraft to achieve the target flight path on the basis of a direction angle measured by the sensor section and a direction angle of the target traveling direction derived by the autopilot section; and
causing the display apparatus to display a relative difference between a target attitude relative to air, representing the target angle-of-attack that has been derived and the target sideslip angle that has been derived, and a current attitude relative to air, representing a current angle-of-attack and a current sideslip angle of the aircraft.

* * * * *